US006545688B1

(12) United States Patent
Loveridge et al.

(10) Patent No.: US 6,545,688 B1
(45) Date of Patent: Apr. 8, 2003

(54) SCANNING AN IMAGE WITHIN A NARROW HORIZONTAL LINE FREQUENCY RANGE IRRESPECTIVE OF THE FREQUENCY AT WHICH THE IMAGE IS RECEIVED

(75) Inventors: Graham David Loveridge, Mountain View, CA (US); Nils Anders Frisk, Menlo Park, CA (US)

(73) Assignee: Genesis Microchip (Delaware) Inc., Alviso, CA (US)

( * ) Notice: Subject to any disclaimer, the term of this patent is extended or adjusted under 35 U.S.C. 154(b) by 230 days.

(21) Appl. No.: 09/592,049

(22) Filed: Jun. 12, 2000

(51) Int. Cl.[7] .............................. G09G 5/26; H04N 7/01

(52) U.S. Cl. .......................... 345/660; 345/3.2; 345/698

(58) Field of Search ................................ 345/660, 668, 345/669, 204, 698, 699, 3.1, 3.2, 3.3, 3.4; 348/555, 556

(56) References Cited

U.S. PATENT DOCUMENTS 5,781,241 A * 7/1998 Donovan .................... 348/441
6,219,023 B1 * 4/2001 Kim ........................... 345/660
6,392,708 B1 * 5/2002 Cho ........................... 348/556
6,404,459 B1 * 6/2002 Kitou et al. ................ 345/699

* cited by examiner

*Primary Examiner*—Matthew Luu
(74) *Attorney, Agent, or Firm*—Staas & Halsey LLP

(57) ABSTRACT

A display unit designed to be scanned within a narrow horizontal scanning range irrespective of the frequency at which the horizontal lines of an image are received. If the horizontal line frequency of the received display signal does not fall within the narrow horizontal scanning range, the image frames in the display signal are scaled at least vertically such that the number of horizontal lines in each scaled image frame times the frame rate falls within the horizontal scanning range. As a result, the images can be scanned within the horizontal range for which a display unit is designed for. The scaling can be performed without using a frame buffer as the frame rate (at which the images are encoded in a display signal) equals the scanning rate.

6 Claims, 4 Drawing Sheets

SCANNING AN IMAGE WITHIN A NARROW HORIZONTAL LINE FREQUENCY RANGE IRRESPECTIVE OF THE FREQUENCY AT WHICH THE IMAGE IS RECEIVED

BACKGROUND OF THE INVENTION

1. Field of the Invention

The present invention relates to display units, and more specifically to a low cost method and apparatus for scanning an image within a narrow horizontal line frequency range irrespective of the horizontal frequency at which the image is received.

2. Related Art

Display units are often used to receive and display image frames contained in a display signal. As used in the present application, display units include both analog display units (typically based on cathode ray tube (CRT) technology) and digital display units (typically based on flat panels). As is well known, the image frames are represented by pixel data elements encoded within display data portion of the display signal.

Display signals are generally characterized by frame rate and horizontal line frequency. The frame rate refers to the number of image frames encoded per second in the display signal. The horizontal line frequency refers to the number of horizontal lines encoded per second in the display signal. In general, a higher frame rate usually leads to better display quality due to correspondingly higher refresh rate. A high horizontal line frequency could be the result of a high frame rate and/or high resolution (number of lines in a frame) in the encoded image frames. In general, different display modes are specified according to corresponding standards, which further specify the frame rate and the horizontal line frequencies among other characteristics.

Display units are often designed to operate in conjunction with display signals of different display modes. Some of the display units automatically (i.e., without manual intervention) detect the specific display mode based on examination of a received display signal, and display the encoded images base on the detected display mode. Such monitors are often referred to as multi-scan display units in the relevant arts.

One problem with the display units which can operate with different display mode is that the overall cost of manufacturing the display units may be high. At least in the case of CRT display units, the high costs may be the result of the need to employ sophisticated deflection circuits (e.g., coils or yokes) which need to move the electronic beam to point from one end of the display screen to the other (horizontally and/or vertically) during the corresponding non-display time. The deflection circuits operating in the horizontal direction may be particularly costly as the retrace time in the horizontal direction may be particularly short. The high costs may be undesirable in many environments, particularly in the consumer markets.

Accordingly, specifications such as Generalized Timing Formula (GTF) developed by VESA allow a display unit to be implemented to operate with one or a very few display modes. According to the GTF, a display unit may indicate to the graphics source (generating the display signal) the specific display timing parameters (such as refresh rate and horizontal line frequency), and the graphics source generates a display signal consistent with the indicated parameters. As a result, a display unit may be implemented to operate with one or a limited numbers of display timing parameters, and thus the cost to manufacture the display unit may be minimized.

Even though the display units based on GTF type solutions may be produced cost effectively, the display units may not be adequate for operation in some situations. For example, a graphics source may not be implemented to support such (e.g., GTF compatible) solutions. Even if a graphics source is implemented to be GTF compliant, the compliance feature may not be always available. For example, a computer system implemented based on Windows 95 software (available from Microsoft Corporation) may not have the GTF compliant feature enabled when the system operates in 'safe mode'.

A prior system may use a frame buffer in such situations to receive images at one rate ("frame rate") and to generate images for scanning at another rate ("scan rate"). The scan rate may be chosen such that the horizontal scanning frequencies falls within a desired frequency range. The scanning frequencies may be determined, for example, based on GTF. For further details on GTF, the reader is referred to a document entitled, "GTF Standard, Version 1.1", available from Video Electronics Standards Association (VESA), and is incorporated in its entirety herewith. Due to the frame rate conversions possible with frame buffers, display units may be implemented with relatively inexpensive deflection circuits.

However, frame buffers add additional cost to the implementation of the overall display units, and may thus be undesirable. Accordingly, what is needed is a cost-effective approach which enables display units to display images within a narrow horizontal frequency range irrespective of the horizontal frequency at which a image is received.

SUMMARY OF THE INVENTION

The present invention enables a display unit to be implemented to scan images within a narrow horizontal frequency range irrespective of the frequencies at which the image frames are encoded in a received display signal. An apparatus scales the image frames in at least a vertical direction such that the number of lines in the scaled image times the frame rate at which the images are encoded in the display signal falls within the horizontal frequency range for which the display unit is designed for.

The scaled images are used to scan a display screen contained within the display unit. The images may be scanned at the same rate ("frame rate") as the rate at which images are encoded in the display signal. As a result, the scaling operation may be implemented without using frame buffer memory type components. In addition, as the display screen is scanned within a narrow scanning frequency range, the cost to implement the scan circuitry and display screen may also be minimized.

Another aspect of the present invention allows an apparatus to be implemented to operate with both analog display signals and digital display signal. An interface circuit may contain an analog to digital converter (ADC) to sample the display data portion of the analog display signal to generate pixel data elements representing the encoded image frames. As is well known, analog display signal contain synchronization signals accompanying the display data portion. The interface circuit may also contain a digital receiver to recover the pixel data elements and synchronization signals encoded in a digital display signal.

A first multiplexor may be provided to select pixel data elements generated by one of the ADC and the digital receiver depending on whether the display unit is presently receiving analog display signal or the digital display signal. A second multiplexor may similarly select the synchronization signals from the two display signal types.

A line measurement circuit may examine the synchronization signals selected by the second multiplexor to determine the input horizontal frequency at which the lines are encoded in the display signal. The input horizontal frequency may be determined by other approaches also. For example, the display data portion of a display signal may be examined to determine the input horizontal frequency. A control circuit may then determine the number of lines to be contained in the scaled image. A scaler may scale the image consistent with the determination of the control circuit.

The control circuit may generate the synchronization signals corresponding to the scaled images. A third multiplexor may select either the scaled image or the image frame under the control of the control circuit. A fourth multiplexor may select the synchronization signals related to the display signal or the signals generated by the control circuit under the control of the control circuit. Thus, the outputs of the third and fourth multiplexors contain the data and signals for scanning the display screen.

As the horizontal lines represented by the outputs of the third and fourth multiplexors are always encoded with a frequency which falls in a pre-specified horizontal scanning range, the cost to implement the screen interfaces may be minimized. For example, relatively inexpensive horizontal deflection circuits may be employed. In addition, as the scaling may also be performed without using frame buffers, the overall cost of display units may also be minimized.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention enables a display unit to scan images within a narrow horizontal line frequency range and at the same time display images which have horizontal lines encoded at a frequency outside of the narrow range. When a display signal containing images encoded at a frequency outside of the narrow range is received, the image is scaled (upscaled or downscaled) to have a number of lines such that the horizontal scanning frequency is within the narrow frequency range for which the display unit is designed for.

The cost to scale the image may be minimized by ensuring that the image is scanned at the same rate ("scan rate") as the rate ("frame rate") at which the images are encoded in the display signal, that is, the scan rate may be maintained to be the same as the frame rate. In addition, as the display unit operates within a narrow horizontal scan frequency range, the cost of the scan circuitry may also be minimized. There may be some level of degradation in the quality of the displayed images, which may be acceptable at least in some situations. Accordingly, a display unit may be implemented cost-effectively in accordance with the present invention.

The present invention is described below in further detail with reference to several examples for illustration. One skilled in the relevant art, however, will readily recognize that the invention can be practiced in other environments without one or more of the specific details, or with other methods, etc. In other instances, well-known structures or operations are not shown in detail to avoid obscuring the invention.

2. Example Environments

In general, the present invention can be implemented within and/or in conjunction with any display unit. For illustration, first an embodiment in which scaling may be performed outside of a display unit is described with reference to FIG. 1A. Then, another embodiment in which the scaling operation is performed within a display unit is described with reference to FIG. 1B. It should be understood that components/steps forming invention can be implemented partially within a display unit and partially outside of a display unit also.

Figure 1A:
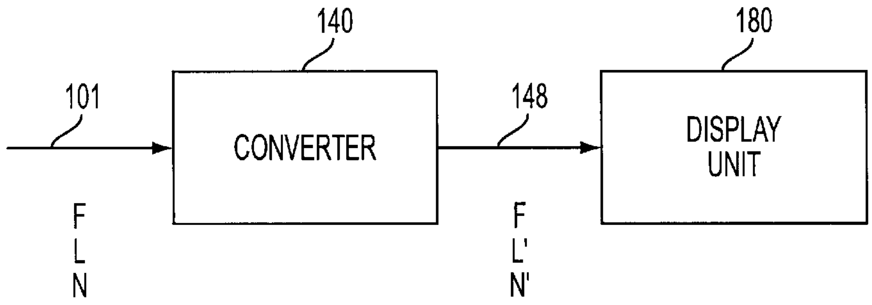
FIG. 1A is a block diagram illustrating the manner in which a converter may be provided external to a display unit in accordance with the present invention.

FIG. 1A is a block diagram containing converter 140 and display unit 180. Display unit 180 may be designed for scanning within a pre-specified horizontal scanning range. In one embodiment, display unit 180 represents a television system and display signal received on path 101 may be generated from a source such as a computer system. The display signals generated by such sources may have a horizontal line frequency which falls outside of a range for which the television system may be designed for. As described in further detail below, converter 140 ensures that the display signal received on path 148 has horizontal scanning frequency which falls within the range.

Converter 140 receives display signals having N lines per image frame at a frame rate of F for an effective horizontal line frequency of L on path 101. If the horizontal line frequency (L) of a display signal is within the scanning range for which display unit 180 is designed, apparatus 180 may merely pass the signal through without modifications. On the other hand, if the horizontal line frequency (L) falls outside of the scanning range of display unit 180, converter 140 scales the image frames to ensure that the scaled images have a horizontal scanning frequency which falls within the range.

The scaled images are also generated at a frame rate of F, but having N' number of lines. The horizontal line frequency of the scaled images equals L'. The manner in which L' and N' can be determined is described below after the description of FIG. 1B. Converter 140 may generate synchronization signals consistent with the scaled images. As a result, display unit 180 may always receive (on path 148) display signals, which have a line frequency falling within the range for which display unit 180 is designed. The operation and implementation of apparatus 180 will be clearer from an understanding of the details of display unit 170 described below with reference to FIG. 1B.

Figure 1B:
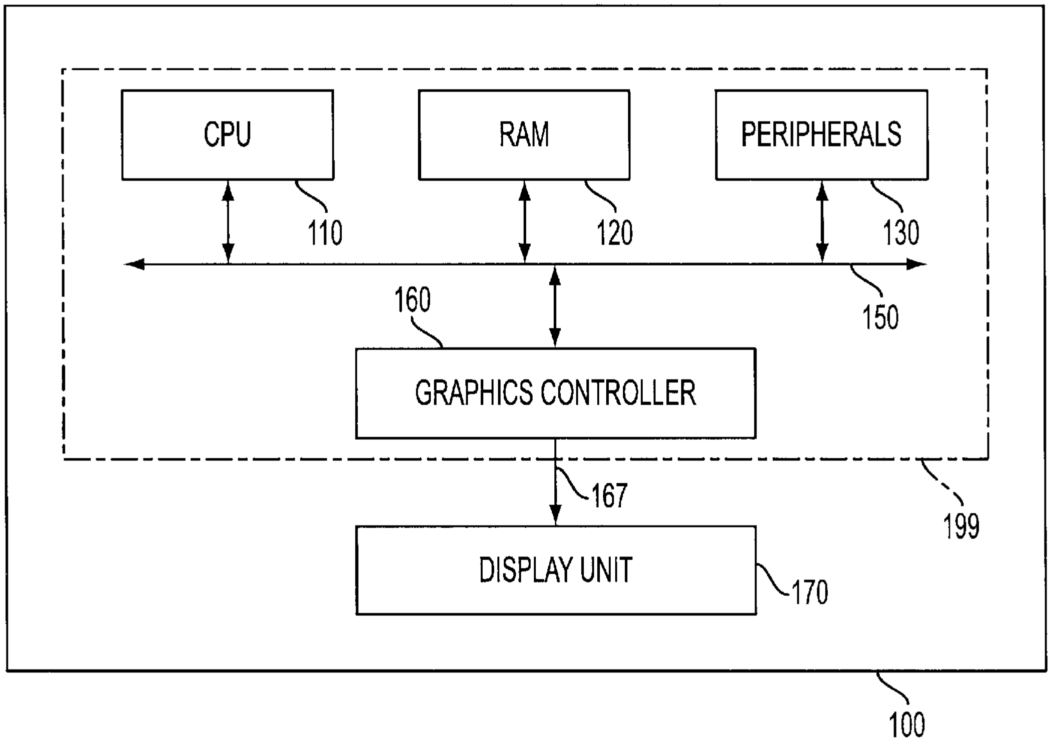
FIG. 1B is a block diagram of a computer system implemented in accordance with the present invention.

FIG. 1B is a block diagram of computer system 100 in which the present invention can be implemented. A computer system may be one of, without limitation, lap-top and desk-top personal computer systems, work-stations, special purpose computer systems, general purpose computer systems, network computers, and many others. Computer system 100 includes central processing unit (CPU) 110, random access memory (RAM) 120, one or more peripherals 130, graphics controller 160, and display unit 170. CPU 110, RAM 120 and graphics controller 160 are typically packaged in a single unit, and such a unit is referred to as graphics source 199 as a display signal is generated by the unit. All the components in graphics source 199 of computer system 100 communicate over bus 150, which can in reality include several physical buses connected by appropriate interfaces.

RAM 120 stores data representing commands and possibly pixel data elements representing a source image. CPU 110 executes commands stored in RAM 120, and causes different commands and pixel data to be transferred to graphics controller 160. Peripherals 130 can include storage components such as hard-drives or removable drives (e.g., floppy-drives). Peripherals 130 can be used to store commands and/or data which enable computer system 100 to operate in accordance with the present invention. By executing the stored commands, CPU 110 provides the electrical and control signals to coordinate and control the operation of various components.

Graphics controller 160 receives data/commands from CPU 110, generates display signals including display data and corresponding synchronization signals, and provides both to digital display unit 170. The display signals may be of analog form or digital form. When the display signals are of analog form, graphics controller 160 contains a digital to analog converter (DAC) for generating the analog display signals from pixel data elements. Analog display signals may be generated in modes such as EGA, VGA and SVGA modes as is well known in the relevant arts.

When the display signal is of digital form, graphics controller 160 may contain a digital transmitter (e.g. panel link product from Silicon Image, Inc., 10131 Bubb Road, Cupertino, Calif. 95014, Phone: (408) 873-3111). The digital transmitter generates digital display signal, for example, according to the standards for flat-panel monitors defined by the Digital Display Working Group (DDWG). Some of the display modes and standards are described in detail in a book entitled, "Programmer's Guide to the EGA, VGA, and Super VGA Cards", published by Addition-Wesley Publishing Company, by Richard F. Ferraro, ISBN Number 0-201-62490-7, which is incorporated in its entirety herewith.

In general, graphics controller 160 first generates pixel data elements of a source image with a predefined width (number of pixels in each horizontal line) and height (measured in terms of horizontal lines). The pixel data elements for a source image may either be provided by CPU 110 or be generated by graphics controller 160 in response to commands from CPU 110. Graphics controller 160 typically includes a digital to analog converter (DAC) for generating a display signal based on the pixel data elements in a known way.

Display unit 170 receives a display signal from graphics controller 160, and displays the images encoded in the display signal. In general, display unit 170 recovers pixel data elements representing a source image and refreshes a display screen (contained within display unit 170) based on the recovered pixel data elements.

Display unit 170 may be designed to display the images in a narrow horizontal line frequency range. In the case of CRT type analog monitors, the narrow frequency range may be chosen to minimize the cost of deflection circuits type scan electronics. In the case of flat panel type digital monitors, the narrow frequency range may be chosen, for example, to use low cost flat panels and associated scan electronics. In one embodiment, display unit 170 is designed to scan within a range of 69,000 to 70,000 lines/second.

As described below in further detail, the present invention enables display unit 170 to generate displays within a desired narrow horizontal rate without requiring components such as frame buffers. The principle underlying the present invention is described first. Then, methods and apparatus implementing the principle are described.

3. The Principle

For illustration, the principle is described with reference to FIG. 1A. However, the description is relevant to the embodiment(s) of FIG. 1B also as will be clear from the further description provided below. The horizontal line frequency (L) of a display signal may be given by the equation:

$$L=F\times N \qquad \text{Equation (1)}$$

wherein N represents the number of lines each source image frame, F represents the rate at which source images are encoded in the display signal, and '×' represents the multiplication operation.

Further assume that it is desirable that a display screen be scanned at a horizontal line rate of L', wherein L' falls within a range falling L1 and L2 as shown by:

$$L1\leqq L'\leqq L2 \qquad \text{Equation (2)}$$

wherein ≦ represents a less than or equal to relationship. Thus, L is either less than L1 or greater than L2. It should be understood that L1 may equal L2 also. As the frame rate is not to changed, L' satisfies the further condition that:

$$L'=N'\times F \qquad \text{Equation (3)}$$

From equations (1) and (3), it follows that:

$$F=L'/N'=L/N \qquad \text{Equation (4)}$$

$$\text{Thus, } N'=(N\times L')/L \qquad \text{Equation (5)}$$

In an embodiment, N' is conveniently computed to equal an integer by an appropriate choice of the desired horizontal line frequency L' but satisfying equation (2). However, practically, a table may be maintained within display unit, with a value of D pre-computed for each of the expected display modes.

The vertical scaling factor (V) may be given by the equation:

$$V=N'/N \qquad \text{Equation (6)}$$

It should be understood that the horizontal scanning frequency falls within the constraint of Equation (2) when the scaled images are scaled at the source frame rate. Such scaling may also be implemented without using frame buffers, and accordingly the overall cost of display unit 170 may be minimized in accordance with the present invention. A method in accordance with the present invention is described next.

4. Method

Figure 2:
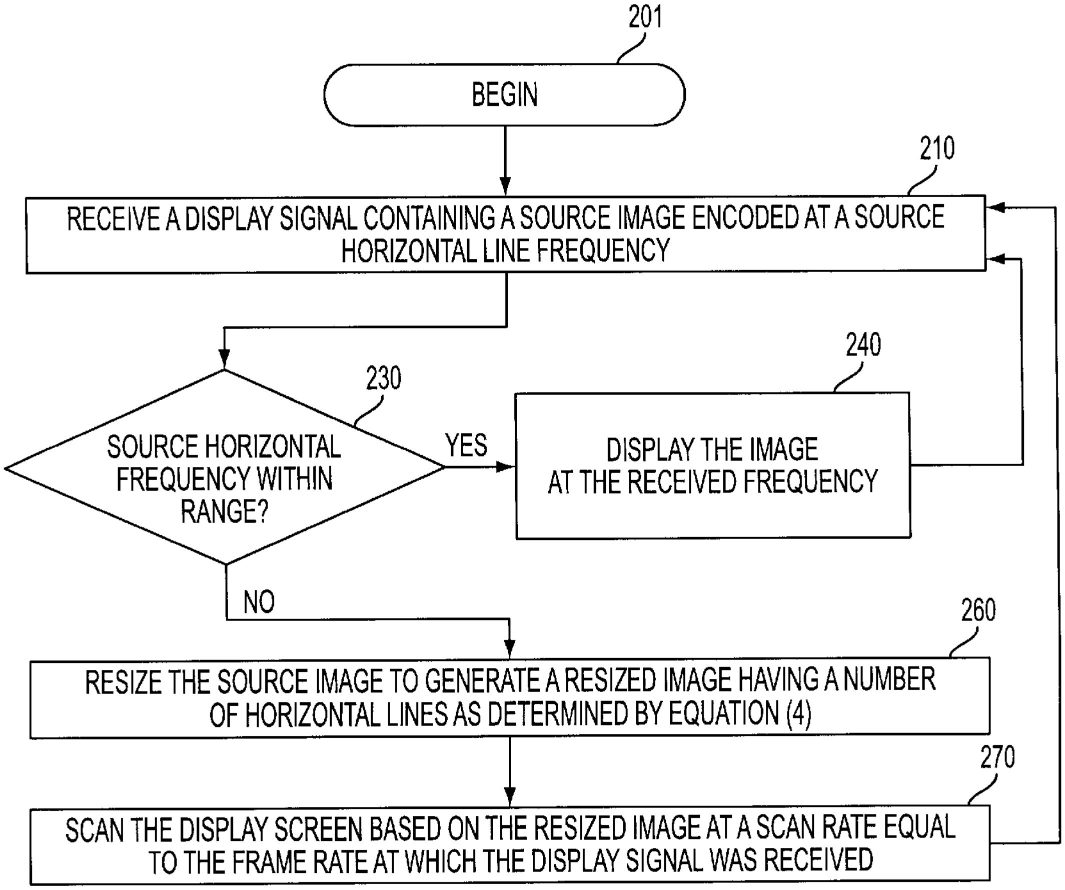
FIG. 2 is a flow chart illustrating a method in accordance with the present invention.

FIG. 2 is a flow chart illustrating a method in accordance with the present invention. The method is described with reference to FIG. 1B for illustration only. The method begins in step 201, in which control passes to step 210. In step 210, display unit 170 receives a display signal containing an image frame from a graphics source. The display signal may be in either analog form or digital form (e.g., pixel data elements encoded in a serial communication channel).

In step 230, display unit 170 determines whether the image frame encoded in the received display signal is encoded with a horizontal line frequency ("source horizontal line frequency") which falls within a range for which display unit 170 is designed for. Control passes to step 260 if the frequency falls withing the range, otherwise control passes to step 260. In step 240, the source image may be scanned on a display screen potentially at the received frequency. Control then passes to step 210, in which the next image frame is received.

In step 260, the source image is scaled to generate a resized image having a number of lines suitable for scanning within a horizontal frequency range for which display unit 170 is designed for. The number of lines may be determined as described above with reference to Equation 4. The scaling operation may be performed in a known way. In one embodiment, scaling is performed only in the vertical direction. In an alternative embodiment, scaling is performed in horizontal direction also to ensure that the resized image resembles the source image closely.

In step 270, the resized image is scanned at a scan rate equaling the frame rate at which the display signal encodes the source image frames. As a result of the resizing performed in step 260, the image is scanned at a horizontal scanning rate, which falls within a range for which display unit 170 is designed. Accordingly, display unit 170 may be implemented without expensive frame buffers while using potentially low cost scan electronics.

Embodiments of display unit 170 are described below in further detail. However, it is useful to first understand the operation and implementation of an apparatus which can be used to implement display unit 170. Companies such as Genesis Microchip (the assignee of the present application), Sage Incorporated (www.sage.com), Pixel Works (www.pixelworksinc.com), and Silicon Imaging (www.siliconimaging.com) may provide such apparatus. The apparatus may then be incorporated into display units by original equipment manufacturers (OEMs) such as Sony, Compaq, and Dell.

5. Apparatus

Figure 3:
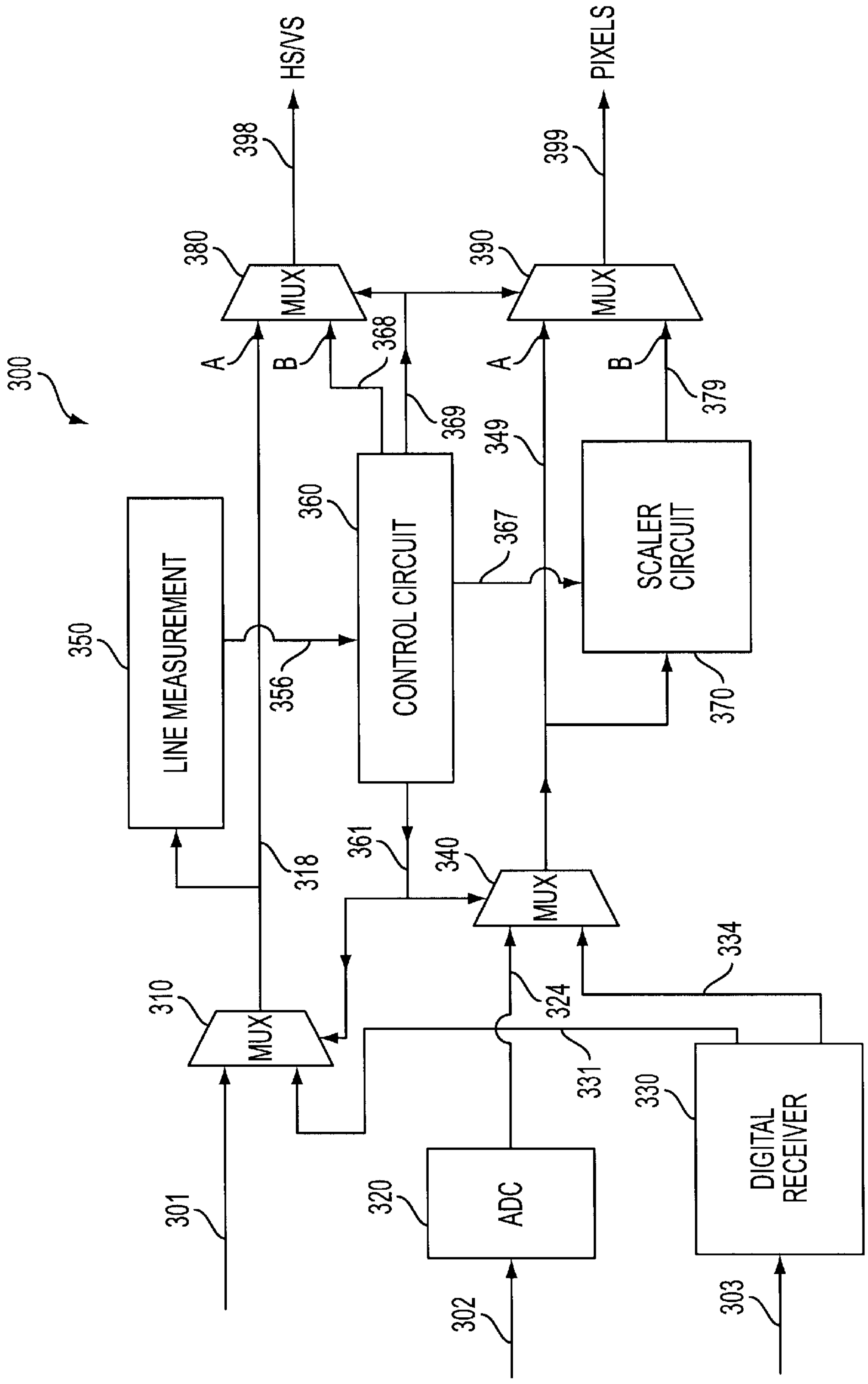
FIG. 3 is a block diagram illustrating the details of am apparatus implemented in accordance with the present invention.

FIG. 3 is a block diagram illustrating the details of an embodiment of apparatus 300 in accordance with the present invention. Apparatus 300 may be implemented in the form of a monolithic integrated circuit, a printed circuit board containing several integrated circuits, etc. Converter 140 may be implemented similar to apparatus 300 as will be readily apparent to one skilled in the relevant arts by reading the disclosure herein.

Apparatus 300 is described as receiving either analog or digital display signals, and generating the display data and control signals for both analog CRT monitors and digital flat panel monitors. A manufacturer may implement such an apparatus because addition of new features within integrated circuits usually does not add much to the overall cost, and in addition 'economies of scale' can be realized by manufacturing a single type of apparatus for many types of display units.

However, it should be understood that the present invention may be implemented with any types of combinations or sub-combinations described herein. For example, an apparatus may be implemented to merely support receiving a digital display signal and generating display signals for an analog CRT display unit. The implementation of all such combinations will be apparent to one skilled in the relevant arts based on the disclosure provided herein. All such implementations to be contemplated to be within the scope and spirit of the present invention.

Continuing with reference to FIG. 3, apparatus 300 may contain multiplexors 310, 340, 380 and 390, ADC 320, digital receiver 330, line measurement circuit 350, control circuit 360, and scaler circuit 370. The synchronization signals (e.g., VSYNC and HSYNC) and the analog display data (e.g., in RGB format) may respectively be received on input paths 301 and 302. The signals received on paths 301 and 302 may be together referred to as an analog display signal. On the other hand, digital display signals may be received on path 303 in the form of a serial communication channel. The manner in which the digital and analog display signals are processed is described below in further detail.

ADC 320 samples the analog display data received on path 302 to generate pixel data elements representing the images encoded in the analog display signal. The pixel data elements are provided on path 324. The specific sampling time points may be controlled by a source clock (not shown) generated based on the synchronization signals received on path 301. Synchronization signals generally indicate the transitions to subsequent lines and frames as is well known in the relevant arts.

Digital receiver 330 receives a digital display signal on path 303, and recovers the encoded pixel data elements and the synchronization signals from the received signal. The recovered pixel data elements are provided on path 334 as one input of multiplexor 340. The synchronization signals are provided on path 324 as one input of multiplexor 310. Digital receiver 330 may be implemented in a known way.

In one embodiment, digital receiver 330 is implemented consistent with the Transition Minimized Differential Signaling (TMDS) standard well known in the relevant arts. In general, ADC 320 and digital receiver 330 are referred to as interface circuits, and usually contain the electrical interface to receive the corresponding types of display signals and generate the pixel data elements representing the image frames.

Multiplexor 310 receives the synchronization signals corresponding to the analog display signals and the digital display signals, and selects one of the two inputs under the control of control circuit 360. Similarly, multiplexor 340 selects the pixel data elements related to the analog display signal or the digital display signals under the control of control circuit 360. As described below in further detail below, the outputs of both multiplexors 310 and 340 relate to either the analog display signal or the digital display signal, which is presently being processed by apparatus 300.

Line measurement circuit 350 determines the number of lines in the presently received frames. In the embodiment(s) of FIG. 3, line measurement circuit 350 counts the number HSYNC pulses in each frame to determine the number of lines. Alternative embodiments which examine other portions of the display signals may also be implemented. For example, the display data portion may be examined (not shown in the drawings) to determine the number of lines. Line measurement circuit 350 indicates the determined number of lines to control circuit 360 on path 367, which causes the image frames to be scaled and displayed according to the principle noted above.

Control circuit 360 controls the operation of multiplexors 310 and 340 to cause the multiplexors to select the signals related to either analog display signal or digital display signal, which is presently being received. Display units using apparatus 300 may be implemented to received only one of the two types of signals at any given time, and control circuit 360 may be configured with the corresponding information.

Control circuit 360 further receives an indication of the number of lines on path 356, and controls scaler circuit 370 to scale the image consistent with the principles noted above. In one embodiment, control circuit 360 determines a vertical scaling factor (in accordance with Equation 5 above), and communicates the factor to scaler circuit 370. Scaler circuit 370 then scales the image frames accordingly. In yet another embodiment, a table (not shown) may be maintained which maps each display mode to a corresponding vertical scaling factor (or number of horizontal lines), and the table may be used in determining the number of horizontal lines in each scaled image.

Control circuit 360 generates the synchronization signals corresponding to the scaled image and provides the generated signals to multiplexor on path 368. Control circuit 360 further controls multiplexors 380 and 390 by asserting appropriate value on path 369 to cause the correct multiplexor inputs to be selected. Specifically, when the images are scaled by scaler circuit 370, the inputs entitled B are caused to be selected. When the images are not scaled, the inputs entitled A are caused to be selected.

Scaler circuit 370 receives pixel data elements representing images on path 349, and scales (upscale or downscale) the image as specified by control circuit 360 on path 367. While the images are scaled in the vertical direction to achieve the desired horizontal line scanning frequency, horizontal scaling may also be optionally performed to maintain the same (or substantially equal) aspect ratio as the input image frame. However, frame buffers are avoided within scaler circuit 370 to minimize the overall cost of display units implemented in accordance with the present invention. Scaler circuit 370 may be implemented in a known way.

Multiplexor 380 receives the synchronization signals from multiplexor 310 on input A and synchronization signals from control circuit 360 on input B. Multiplexor 380 selects one of the two inputs as specified on path 368. Similarly, multiplexor 390 selects one of the two inputs A (path 349) or B (path 379) as specified by control circuit 360 on path 369.

From the above, it may be appreciated that output 399 of multiplexor 390 contains the image frames (either scaled or without being scaled), and output 398 of multiplexor 398 contains the synchronization signals corresponding to the image frames selected on output 399. Apparatus 300 can be used by different types (both CRT analog and digital) of display units to process analog and/or digital display signals. Example display units are described below for illustration.

6. Example Display units

Figure 4A:
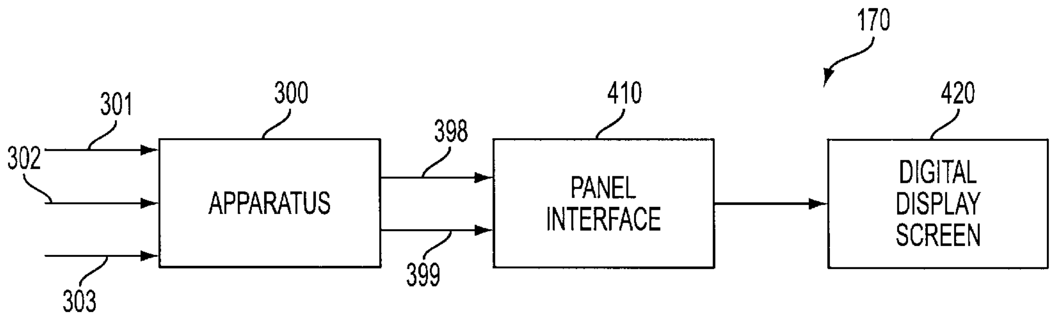
FIG. 4A is a block diagram illustrating the details of an example display unit implemented in accordance with the present invention.

FIG. 4A is a block diagram of display unit 170 illustrating the operation and implementation in one embodiment of the present invention. Display unit 170 contains apparatus 300, panel interface 410 and digital display screen 420. Each component is described below in further detail.

Apparatus 300 receives the synchronization signals on path 301 and display data on path 302. Apparatus 300 generates image frames (on path 399) having a horizontal scanning rate which falls within a range for which display screen 420 is designed for. The corresponding synchronization signals are generated on path 398. Apparatus 300 may be implemented according to the principles and description provided above. Apparatus 300 may be implemented as a monolithic apparatus (one chip) for cost-effectiveness.

Panel interface 410 is implemented consistent with the characteristics of display screen 420. In one embodiment, display screen 420 is implemented for a horizontal scan rate falling within the range of 69,000 to 71,000 lines per second. Thus, irrespective of the display mode of the display signal received by apparatus 300, the image frames are received at a rate falling within that range. Accordingly, panel interface 410 scans display screen 420 with a horizontal rate which falls within the range for which display screen 420 is designed for.

For example, when a display signal corresponds to a safe mode in which each image frame has 525 lines (VGA mode) and with a refresh rate 60 Hz, the image is upscaled to contain 1166 lines such that the horizontal line rate is increased from 31.5 kHz to 69.96 kHz. Thus, using a similar approach, display unit 170 of FIG. 4A may be used to display images of any display mode.

Figure 4B:
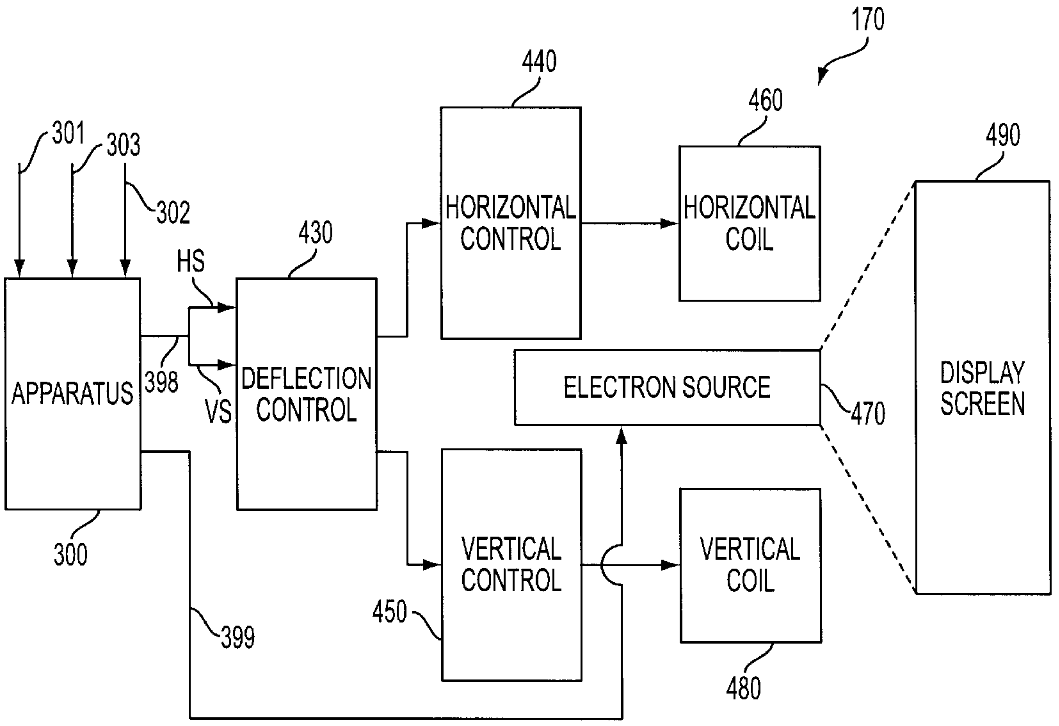
FIG. 4B is a block diagram illustrating the details of an alternative embodiment of display unit implemented in accordance with the present invention.

FIG. 4B is a block diagram the logical view of an alternative embodiment of display unit 170. Display unit 170 is shown containing apparatus 300, deflection control 430, horizontal coil control 440, vertical coil control 450, horizontal coils 460, electron source 470, vertical coils 480, and display screen 490. The operation and implementation of apparatus 300 is described to above. The remaining components of FIG. 4B are described below.

Deflection control 430 receives the synchronization signals (VS and HS) on path 398, and determines the horizontal (and vertical) deflections to be applied by horizontal coil control 440 (and vertical coil control 450). It should be noted that HS value is within a narrow range of values reflecting the narrow horizontal scanning frequency, and VS value reflects the frame rate at which the images are encoded in the received display signal.

Electron source 470 generates electrons which 'bombard' display screen 490 to cause images to be generated. The electrons are generated based on the display data received on path 399. The specific point on display screen 490 where each electron bombards, is controlled by horizontal deflection coil 460 and vertical deflection coil 480.

As the horizontal scanning frequency may be implemented to be within a narrow range, the cost of implementing horizontal column control 440 and horizontal coil 460 may be minimized. In addition, as the scaling may also be achieved without using frame buffers, the overall cost of display unit 170 and computer system 100 may also be minimized.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for use in a display unit containing a display screen, said display screen being designed for scanning in a horizontal scanning range, said apparatus comprising:

an interface circuit containing electrical interface to receive a display signal encoded with a sequence of image frames at a frame rate, each of said sequence of image frames containing a plurality of horizontal lines, said horizontal lines being encoded in said display signal at an input horizontal frequency, said interface circuit recovering a plurality of pixel data elements representing said sequence of image frames;

a line frequency determination circuit examining said display signal to determine said input horizontal frequency;

a control circuit coupled to said line frequency determination circuit, said control circuit determining a number such that said frame rate times said number falls within said horizontal scanning range if said input horizontal frequency is not within said horizontal scanning range; and a scaler circuit scaling each of said sequence of image frames in a vertical direction to generate a corresponding scaled image, wherein each scaled image contains a number of horizontal lines equal to said number determined by said control circuit, wherein said scaled images are generated at a rate equal to said frame rate such that the scaling operation can be performed without a frame buffer, wherein said scaled images are used to display images on said display screen, whereby said scaled images are scanned on said display screen within said horizontal scanning range irrespective of the value of said input horizontal frequency;

wherein said interface circuit comprises an ADC and a digital receiver, said ADC sampling the display data portion of an analog signal to generate said plurality of pixel data elements, said digital receiver recovering said plurality of pixel data elements and synchronization signals from a digital display signal, said apparatus further comprising:

a first multiplexor selecting said pixel data elements generated by one of said ADC and said digital receiver; and a second multiplexor selecting one of said synchronization signals recovered by said digital receiver and synchronization signals accompanying said analog signals, whereby said apparatus can be used in conjunction with both analog display signals and digital display signals.

2. An apparatus for use in a display unit containing a display screen, said display screen being designed for scanning in a horizontal scanning range, said apparatus comprising:

an interface circuit containing electrical interface to receive a display signal encoded with a sequence of image frames at a frame rate, each of said sequence of image frames containing a plurality of horizontal lines, said horizontal lines being encoded in said display signal at an input horizontal frequency, said interface circuit recovering a plurality of pixel data elements representing said sequence of image frames;

a line frequency determination circuit examining said display signal to determine said input horizontal frequency;

a control circuit coupled to said line frequency determination circuit, said control circuit determining a number such that said frame rate times said number falls within said horizontal scanning range if said input horizontal frequency is not within said horizontal scanning range; and a scaler circuit scaling each of said sequence of image frames in a vertical direction to generate a corresponding scaled image, wherein each scaled image contains a number of horizontal lines equal to said number determined by said control circuit, wherein said scaled images are generated at a rate equal to said frame rate such that the scaling operation can be performed without a frame buffer, wherein said scaled images are used to display images on said display screen, whereby said scaled images are scanned on said display screen within said horizontal scanning range irrespective of the value of said input horizontal frequency, further comprising:

a third multiplexor coupled to receive said image frames and said scaled images on a respective one of two inputs, and selecting one of the two inputs on an output path;

a fourth multiplexor coupled to receive synchronization signals corresponding to said image frames and said scaled images on a respective one of two inputs, and selecting one of the two inputs on an output path, whereby the output paths of said third multiplexor and said fourth multiplexor contain the signals to scan said display screen.

3. The apparatus of claim 2, wherein said display screen comprises a digital display screen.

4. The apparatus of claim 2, wherein said display screen comprises an analog display screen.

5. The apparatus of claim 2, wherein said control circuit controls the selection of said third multiplexor and said fourth multiplexor, said control circuit further generating said synchronization signals for said scaled images.

6. A display unit for displaying the images encoded in a display signal, said images being encoded as a sequence of image frames at a frame rate, each of said sequence of image frames containing a plurality of horizontal lines, said horizontal lines being encoded in said display signal at an input horizontal frequency, said display unit comprising:

a display screen designed for scanning in a horizontal scanning range; and an apparatus receiving said display signal and determining whether said input horizontal frequency falls within said horizontal scanning range, said apparatus scaling each of said sequence of image frames to generate a corresponding scaled image, each scaled image containing a number of horizontal lines such that said frame rate times said number falls within said horizontal scanning range if said input horizontal frequency is not within said horizontal scanning range, wherein said scaled images are generated at a rate equal to said frame rate such that the scaling operation can be performed without a frame buffer; and a screen interface coupled to said display screen and said apparatus, said screen interface scanning said display screen based on said scaled images generated by said apparatus, wherein apparatus comprises:

an interface circuit containing electrical interface to receive said display signal, said interface circuit recovering a plurality of pixel data elements representing said sequence of image frames;

a line frequency determination circuit examining said display signal to determine said input horizontal frequency;

a control circuit coupled to said line frequency determination circuit said control circuit determining said number if said input horizontal frequency is not within said horizontal scanning range; and a scaler circuit scaling each of said sequence of image frames, wherein said interface circuit comprises an ADC and a digital receiver, said ADC sampling the display data portion of an analog signal to generate said plurality of pixel data elements, said digital receiver recovering said plurality of pixel data elements and synchronization signals from a digital display signal, said apparatus further comprising:

a first multiplexor selecting said pixel data elements generated by one of said ADC and said digital receiver; and a second multiplexor selecting one of said synchronization signals recovered by said digital receiver and synchronization signals accompanying said analog signals, whereby said apparatus can be used in conjunction with both analog display signals and digital display signals.

* * * * *